United States Patent
Luo et al.

(10) Patent No.: US 8,572,270 B2
(45) Date of Patent: Oct. 29, 2013

(54) METHOD AND APPARATUS FOR BACKING UP TCP CONNECTION

(75) Inventors: Hanjun Luo, Shenzhen (CN); Boyan Tu, Shenzhen (CN); Yu Fu, Shenzhen (CN); Yong Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 598 days.

(21) Appl. No.: 12/204,499

(22) Filed: Sep. 4, 2008

(65) Prior Publication Data

US 2008/0320188 A1    Dec. 25, 2008

Related U.S. Application Data

(63) Continuation of application No. PCT/CN2007/070048, filed on May 23, 2007.

(30) Foreign Application Priority Data

Aug. 24, 2006   (CN) .......................... 2006 1 0062341

(51) Int. Cl.
*G06F 15/16*    (2006.01)

(52) U.S. Cl.
USPC ........... 709/230; 709/219; 709/231; 709/232; 709/238; 709/239

(58) Field of Classification Search
USPC .................. 709/230, 219, 231, 232, 238, 239
See application file for complete search history.

(56) References Cited

U.S. PATENT DOCUMENTS

| | | | |
|---|---|---|---|
| 6,195,680 B1 * | 2/2001 | Goldszmidt et al. .......... | 709/203 |
| 6,404,739 B1 * | 6/2002 | Gonno .......................... | 370/236 |
| 6,594,229 B1 * | 7/2003 | Gregorat ...................... | 370/219 |
| 6,853,617 B2 * | 2/2005 | Watson et al. ................ | 370/218 |
| 6,915,364 B1 | 7/2005 | Christensen et al. | |

(Continued)

FOREIGN PATENT DOCUMENTS

| | | |
|---|---|---|
| CN | 1339211 | 3/2002 |
| CN | 1339749 | 3/2002 |

(Continued)

OTHER PUBLICATIONS

International Search Report for International Application No. PCT/CN2007/070048, dated Aug. 1, 2007, with English translation.

(Continued)

*Primary Examiner* — Firmin Backer
*Assistant Examiner* — Jonathan Bui
(74) *Attorney, Agent, or Firm* — Conley Rose, P.C.; Grant Rodolph; Rayhao Chung

(57) ABSTRACT

A method for backing up a TCP connection includes a data transmission process and a data receiving process. The data transmission process includes obtaining, by an AMB of a transmitting end, boundary information of data; and backing up the data and the boundary information of the data to a SMB of the transmitting end. The data receiving process includes backing up, by the SMB, data received from a peer side of the TCP connection and the boundary information of the data received by the peer side to the AMB; and deleting the data received by the peer side from the data backed up by the SMB during the transmission process according to the boundary information of the data received by the peer side. The disclosure also provides an apparatus for backing up a TCP connection.

13 Claims, 5 Drawing Sheets

(56) References Cited

U.S. PATENT DOCUMENTS

| | | | |
|---|---|---|---|
| 6,961,327 B2* | 11/2005 | Niu | 370/338 |
| 7,058,080 B1 | 6/2006 | Yamada et al. | |
| 7,116,634 B1* | 10/2006 | Hanselmann | 370/219 |
| 7,145,903 B2 | 12/2006 | Gutierrez | |
| 7,251,745 B2* | 7/2007 | Koch et al. | 714/11 |
| 7,292,573 B2* | 11/2007 | LaVigne et al. | 370/390 |
| 8,122,144 B2* | 2/2012 | Borgendale et al. | 709/232 |
| 2001/0052024 A1* | 12/2001 | Devarakonda et al. | 709/238 |
| 2002/0167952 A1* | 11/2002 | Watson et al. | 370/401 |
| 2003/0035420 A1* | 2/2003 | Niu | 370/389 |
| 2003/0043790 A1 | 3/2003 | Gutierrez | |
| 2004/0100899 A1* | 5/2004 | Mahamuni | 370/216 |
| 2004/0117485 A1* | 6/2004 | Yang | 709/227 |
| 2004/0268175 A1* | 12/2004 | Koch et al. | 714/4 |
| 2005/0055520 A1* | 3/2005 | Kappler | 711/162 |
| 2005/0220092 A1* | 10/2005 | LaVigne et al. | 370/389 |
| 2006/0095567 A1* | 5/2006 | Biran et al. | 709/224 |
| 2006/0129650 A1* | 6/2006 | Ho et al. | 709/207 |
| 2006/0164974 A1* | 7/2006 | Ramalho et al. | 370/219 |
| 2006/0171301 A1* | 8/2006 | Casper et al. | 370/225 |
| 2006/0198296 A1* | 9/2006 | Majee et al. | 370/216 |
| 2007/0005787 A1* | 1/2007 | Igarashi et al. | 709/230 |
| 2007/0008880 A1* | 1/2007 | Buchko et al. | 370/218 |
| 2007/0140111 A1* | 6/2007 | Ramanan et al. | 370/220 |
| 2007/0250671 A1* | 10/2007 | Lyon | 711/162 |
| 2007/0260870 A1* | 11/2007 | Nissan et al. | 713/150 |
| 2007/0299973 A1* | 12/2007 | Borgendale et al. | 709/227 |
| 2008/0031129 A1* | 2/2008 | Arseneault et al. | 370/218 |
| 2008/0034112 A1* | 2/2008 | Imai et al. | 709/238 |
| 2008/0040494 A1* | 2/2008 | Kumar et al. | 709/230 |
| 2008/0294784 A1* | 11/2008 | Wang | 709/228 |

FOREIGN PATENT DOCUMENTS

| | | |
|---|---|---|
| CN | 1410904 A | 4/2003 |
| DE | 10031670 | 1/2001 |
| JP | 2001292151 | 10/2001 |
| KR | 20060068532 A | 6/2006 |
| WO | 03063430 A | 7/2003 |

OTHER PUBLICATIONS

Alvisi L et al: "Wrapping server-side TCP to mask connection failures", XP010538713, dated Apr. 22, 2001; total 10 pages.

"Providing Open Architecture High Availability Solutions Revision 1.0", dated Feb. 2001; total 112 pages.

Notice of Opposition issued in corresponding European patent application No. EP07252874.8, dated Oct. 23, 2010; total 15 pages.

Search report issued in corresponding European patent application No. EP07252874.8, dated Mar. 5, 2008; total 8 pages.

Office action issued in corresponding Chinese patent application No. 200780000357.8, dated Apr. 2, 2010; and English translation thereof, total 5 pages.

Written Opinion issued in corresponding PCT application No. PCT/CN2007/070048, dated Aug. 30, 2007; total 3 pages.

Response to Notice of Opposition, European Office Action, European Patent No. 1909468 B1, dated Sep. 30, 2011, 16 pages.

* cited by examiner

METHOD AND APPARATUS FOR BACKING UP TCP CONNECTION

CROSS-REFERENCE TO RELATED APPLICATIONS

This application is a continuation of International Application No. PCT/CN2007/070048, filed May 23, 2007. This application claims the benefit and priority of Chinese Application No. 200610062341.7, filed Aug. 24, 2006. The entire disclosures of each of the above applications are incorporated herein by reference.

FIELD

The disclosure relates to data communication technology, and particularly, to a method and an apparatus for backing up a Transmission Control Protocol (TCP) connection.

BACKGROUND

This section provides background information related to the present disclosure which is not necessarily prior art.

TCP is a reliable packet transmission control protocol which achieves packet retransmission through a slide window scheme. However, the complexity of TCP sequence number acknowledgement and retransmission schemes makes it hard to backup a TCP connection.

Currently, there are generally two methods to back up the TCP connection, i.e., TCP multicast scheme and TCP mirror scheme. In the TCP multicast scheme, packets received and transmitted by an active TCP connection is backed up to a standby TCP connection. This scheme may bring loss of the packets and disorder of the packets. In the TCP mirror scheme, each of an Active Main Board (AMB) and a Standby Main Board (SMB) includes an application module, a TCP module and a socket. The TCP module of the SMB processes packets first, i.e., during a packet receiving process, the TCP module of the SMB receives the packets first, then duplicates the packets received and sends the packets duplicated to the TCP module of the AMB. During a packet transmission process, the TCP module of the AMB sends packets to the TCP module of the SMB first and the TCP module of the SMB sends the packets out. As the backup is implemented in the TCP layer, the TCP module of the AMB may segment data from the application module into multiple TCP packets and send the TCP packets to the TCP module of the SMB. The utilization rate of Inter-Process Communication (IPC) channel is rather low. Moreover, the backup of the packets occupies lots of resources and the communication efficiency is low. In addition, all the operations in the TCP mirror scheme have to be completed by the TCP module of the SMB first, which involves redundant processing steps and decreases the communication efficiency.

When the application module of the AMB has data to send, the TCP module of the AMB segments the data into multiple packets. Suppose a TCP connection switchover occurs when some of the packets have been sent to a peer side of the TCP connection. If the TCP module of the SMB re-transmits all the packets after the TCP connection switchover, the peer side will combine the packets received before the switchover with those received after the switchover to obtain the data sent by the application module of the AMB. Because there are duplicate packets between the packets received before the switchover and those after the switchover, the sequence numbers of the duplicate packets are different, the data obtained are incomplete and incorrect.

SUMMARY

This section provides a general summary of the disclosure, and is not a comprehensive disclosure of its full scope or all of its features.

Various embodiments of the disclosure provide a method and an apparatus for backing up a Transmission Control Protocol (TCP) connection, so as to improve the reliability of the backup of the TCP connection and the transmission efficiency of the TCP connection.

A method for backing up a TCP connection includes: a data transmission process and a data receiving process; wherein the data transmission process includes: obtaining, by an Active Main Board (AMB) of a transmitting end, boundary information of data to be sent; backing up the data to be sent and the boundary information of the data to be sent, by the AMB of the transmitting end, to a Standby Main Board (SMB) of the transmitting end;

the data receiving process includes: backing up, by the SMB of the transmitting end, data received from a peer side of the TCP connection and the boundary information of the data received by the peer side to the AMB of the transmitting end; deleting, by the SMB of the transmitting end, the data backed up by the SMB and has been received by the peer side during the transmission process according to the boundary information of the data received by the peer side.

A method for backing up a TCP connection during a data transmitting process includes: obtaining boundary information of data to be sent; backing up the data to be sent and boundary information of the data to be sent.

An apparatus for backing up a TCP connection, configured to transmit data to a peer side of the TCP connection and receive data from the peer side, includes: an AMB, configured to back up the data to be sent and boundary information of the data to be sent to an SMB; the SMB, configured to back up data received from the peer side and the boundary information of the data received by the peer side to the AMB, and delete the data received by the peer side from the data backed up according to the boundary information of the data received by the peer side.

The method provided by various embodiments of the disclosure obtains boundary information of the data to be sent, backs up the data to be sent and the boundary information to the SMB, re-transmits, after the switchover from the AMB to the SMB, the data according to the boundary information of the data backed up to ensure that the peer side can receive a complete copy of the data. Therefore the integrality of the data is ensured during the switchover and the reliability of switchover is improved. The embodiments of the disclosure not only ensure the integrality of the data, but also simplify the buffering process of the data by backing up the data to the AMB and SMB separately, i.e., each of the AMB and the SMB only back up the data in one direction, which has an improved efficiency.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

One of embodiments of the disclosure is further explained hereinafter in detail with reference to accompanying drawings to make the technical solution and merits of the disclosure more apparent. It should be appreciated that the embodiments herein are only used for explaining the disclosure and shall not be used for limiting the protection scope of the disclosure.

The method provided by the embodiments of the disclosure obtains boundary information of the data to be sent, backs up the data to be sent and the boundary information to the SMB. Thus, the SMB can retransmit the data according to the boundary information after the switchover from the AMB to the SMB to ensure the peer side to receive a complete copy of the data and thereby ensure the integrity of the data.

In the embodiments of the disclosure, the TCP connection is backed up in two directions separately, i.e., a transmission direction and a receiving direction. During the transmission process, the embodiments of the disclosure back up the TCP connection to the SMB; during the receiving process, back up to the AMB. To implement the embodiments of the disclosure, a bumper is added to the AMB and the SMB, respectively. The bumpers are configured to implement the back up of the TCP connection in the two directions.

Figure 1:
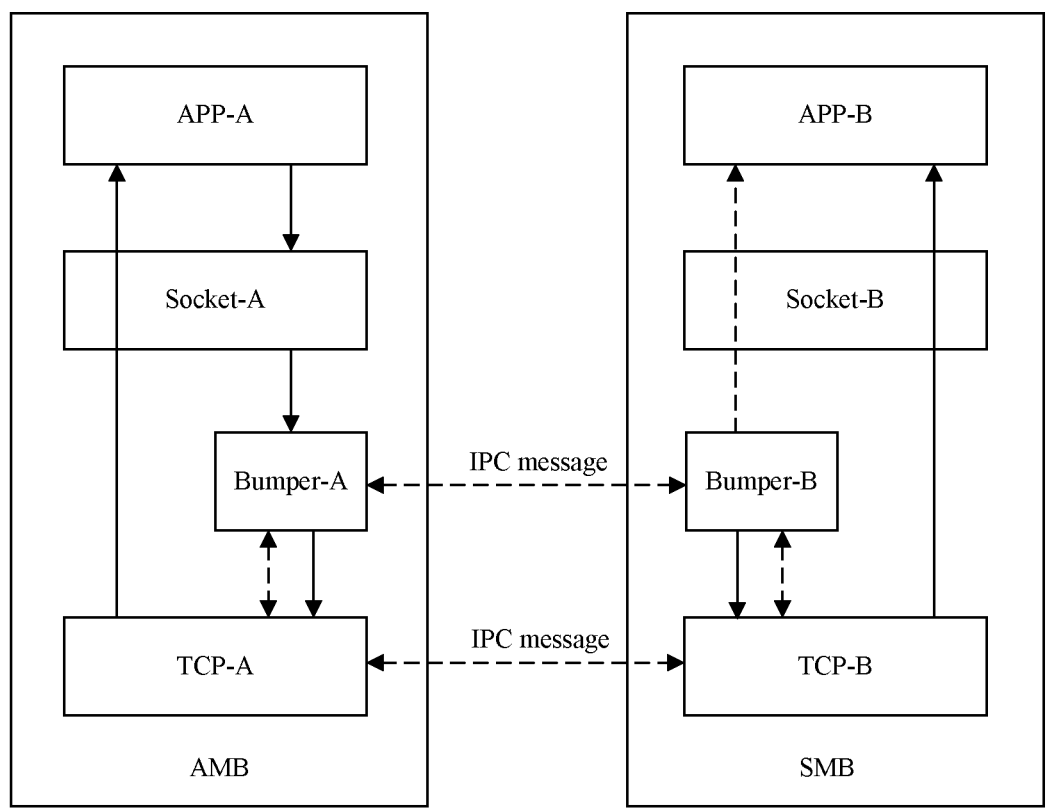
FIG. 1 is a schematic diagram illustrating a structure of an apparatus for TCP connection backup in which a bumper is located under the socket according to an embodiment of the disclosure.
Figure 2:
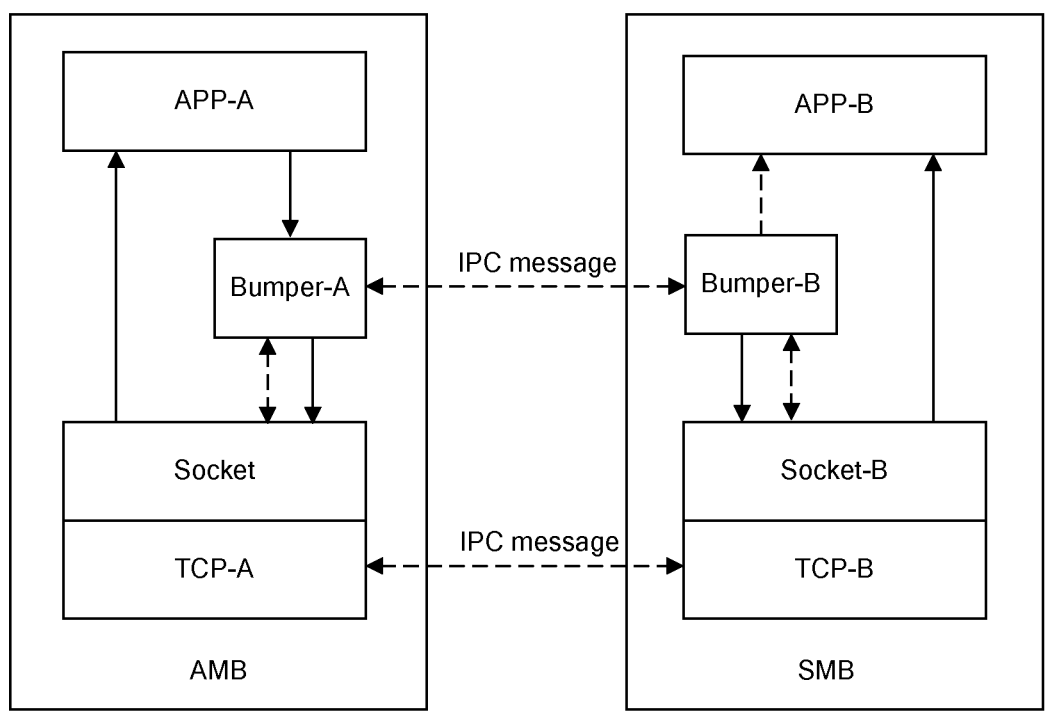
FIG. 2 is a schematic diagram illustrating a structure of an apparatus for TCP connection backup in which a bumper is located above the socket according to an embodiment of the disclosure.
Figure 3:
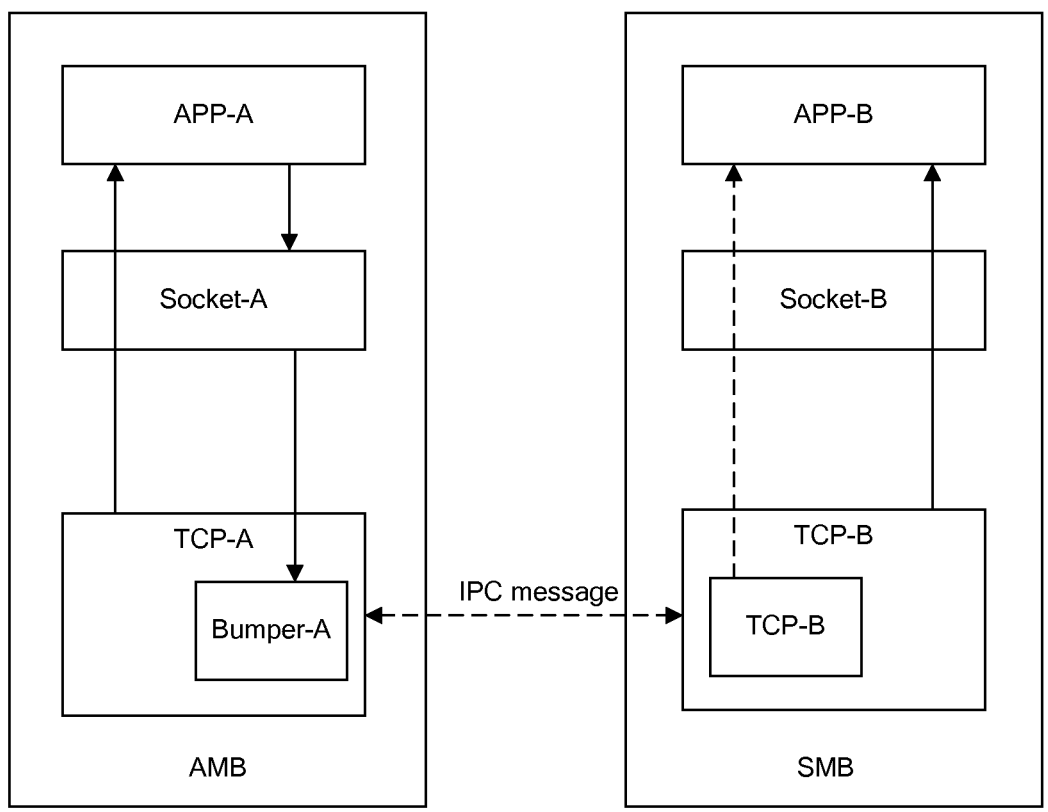
FIG. 3 is a schematic diagram illustrating a structure of an apparatus for TCP connection backup in which a bumper is located in the TCP module according to an embodiment of the disclosure.

FIGS. 1 to 3 are schematic diagrams illustrating structures of apparatuses for TCP connection backup according to embodiments of the disclosure. The apparatus includes an AMB and an SMB. Each of the AMB and the SMB includes an application module, a bumper, a socket and a TCP module. The modules in the AMB are referred to as APP-A, bumper-A, socket-A and TCP-A respectively hereinafter, and similarly, APP-B, bumper-B, socket-B and TCP-B in the SMB. The bumper-A and bumper-B communicates with each other through Inter Process Communication (IPC) messages, and also the TCP-A and the TCP-B.

The bumper may be located between the TCP module and the socket, as shown in FIG. 1, or be located above the socket, as shown in FIG. 2, or be located in the TCP module, as shown in FIG. 3.

When the APP-A has data to send, the TCP-A segments the data into multiple packets. The bumper-A cooperates with the TCP-A to determine the boundary information of the data to be sent, i.e., the begin sequence number and the end sequence number of the packets segmented. Then the bumper-A backs up the data to be sent and the boundary information to the bumper-B to ensure the data can be transmitted to the peer side after the switchover. Once the switchover occurs, the TCP-B retransmits the data according to the boundary information backed up to ensure the integrity of the data.

Figure 4:
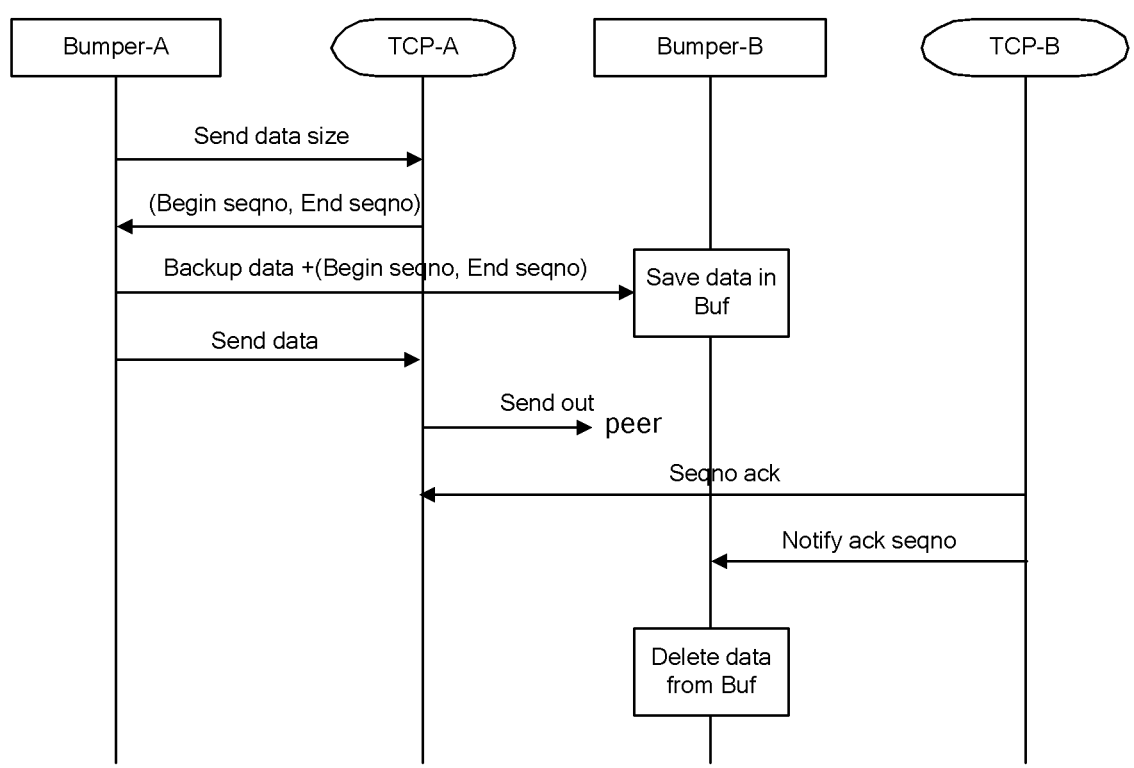
FIG. 4 is a flowchart of a data transmission according to an embodiment of the disclosure.

As shown in FIG. 4, during the data transmission process, the APP-A sends the data and data size information to the bumper-A through the socket-A. Then the bumper-A sends the data size information to the TCP-A, the TCP-A calculates the begin sequence number and the end sequence number of the data according to the data size information and a Maximum Segment Size (MSS) of the TCP connection, and returns the begin sequence number and the end sequence number calculated to the bumper-A. The bumper-A may directly calculate out the begin sequence number and the end sequence number of the data to be sent next time according to the end sequence number received and the data size information of the data to be sent next time. The bumper-A backs up the data to be sent and the begin sequence number and the end sequence number to the bumper-B.

In other embodiments of the disclosure, the above process may also be implemented in an asynchronous way, i.e., a slide window is adopted for the data transmission process of the bumper-A to the bumper-B. The bumper-A may continuously send multiple blocks of data to the bumper-B, and the bumper-B returns an acknowledgement after receiving the multiple blocks of data to confirm the successful reception of the multiple blocks of data. The bumper-A monitors the state of the bumper-B by a timer. If the bumper-A does not receive the acknowledgement from the bumper-B until the timer expires, the bumper-A retransmits the data. The slide window solves the problem that the APP-A takes the successful reception for granted after sending the data to the socket-A, although it may lead to permanent loss of the data.

The bumper-A sends the data to the TCP-A, the TCP-A transmits the data to the peer side. Meanwhile, the bumper-B transmits the data received to the APP-B transparently. The APP-B analyzes the data received and determines the destination information of the data to ensure the synchronous operation of the AMB and the SMB.

It can be seen from the fore-going descriptions that the TCP-A sends packets to the peer side while calculating the boundary information with the bumper-A, therefore the transmission efficiency of the TCP-A is not affected and may still be kept at a high level even with High Availability (HA).

Figure 5:
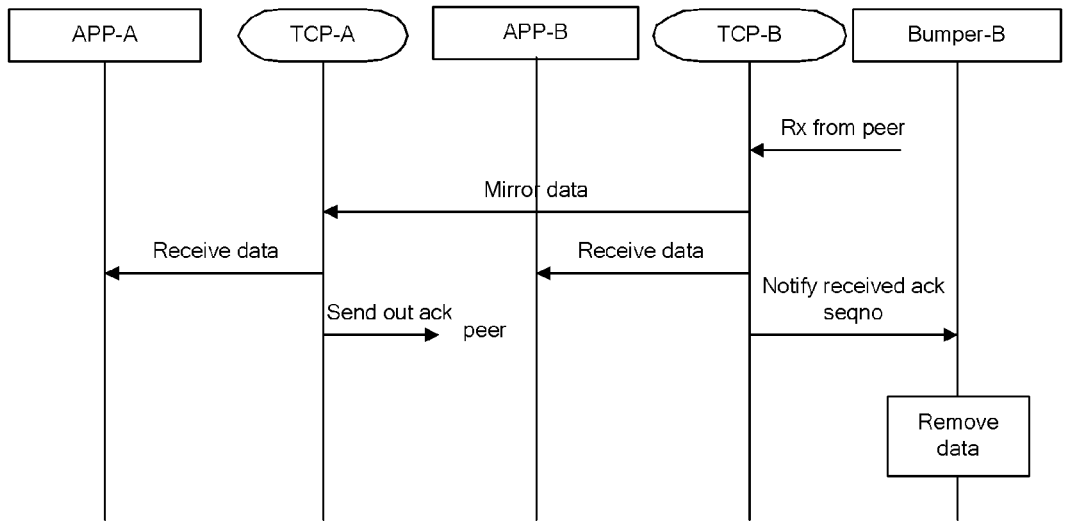
FIG. 5 is a flowchart of a data receiving process according to an embodiment of the disclosure.

FIG. 5 is a flowchart of a data receiving process according to an embodiment of the disclosure. As shown in FIG. 5, during the data receiving process, the TCP-B receives from the peer side an acknowledgement indicating the sequence number of the packets received by the peer side, and sends the sequence number of the packets received by the peer side to the TCP-A. The TCP-B also receives packets from the peer side and sends the packets to the TCP-A. The TCP-A sends the packets received to the APP-A and an acknowledgment to the peer side. Meanwhile, the TCP-B sends the sequence number of the packets received by the peer side to the bumper-B, the bumper-B determines the data received by the peer side according to the sequence number and deletes the data backed up by the bumper-B received by the peer side.

In another embodiment of the disclosure, both the data transmission and receiving processes may be performed by the SMB. The bumper-A obtains the boundary information of the data to be sent from the TCP-A, backs up the data to be sent and the boundary information to the bumper-B to ensure that the data sent from APP-A to the TCP-A can be transmitted to the peer side after the switchover. The bumper-B sends the data to be sent to the TCP-B, the TCP-B transmits the data to be sent to the peer side. If the switchover occurs, the TCP-B retransmits the data according to the data sequence number backed up by the bumper-B to ensure the integrality of the data.

If the switchover occurs after a part of the data has been sent to the peer side, provided that the sequence numbers of the packets segmented from data are (m, m+5) and the sequence number returned by the peer side is m+2. It may be determined that the peer side has received the packets with sequence numbers (m, m+1).

Figure 6:
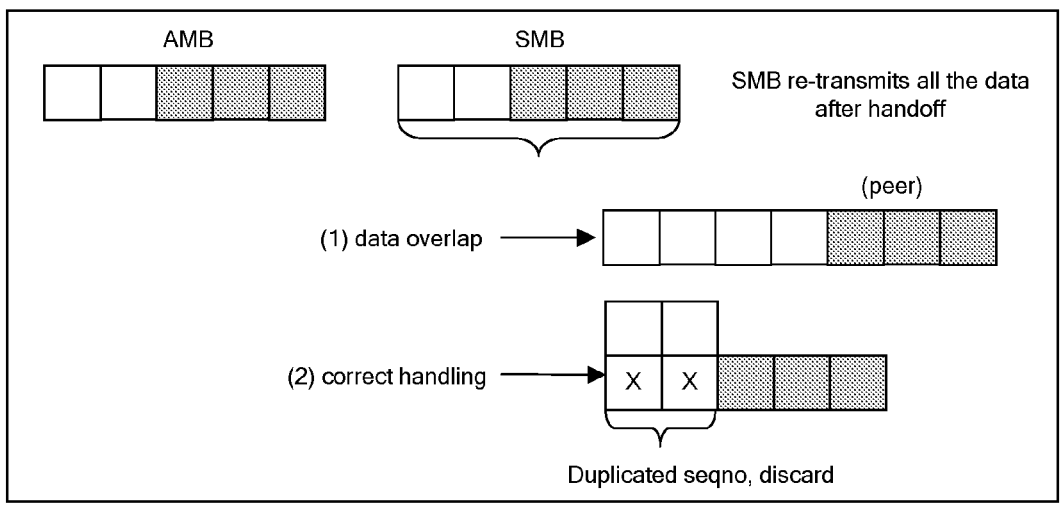
FIG. 6 is a schematic diagram illustrating a data retransmission process after a switchover from the AMB to the SMB according to an embodiment of the disclosure.

After the switchover from the AMB to the SMB, the APP-B retransmits the data. The bumper-B retrieves corresponding packets from buffer and sends the packets with the sequence numbers (m, m+5) to the TCP-B, the TCP-B transmits the packets to the peer side. Upon the receipt of the packets with the sequence numbers (m, m+5), the peer side discards the packets with sequence numbers (m, m+1) and accepts the packets with sequence numbers (m+2, m+5) according to the slide window scheme. Then the TCP-B re-constructs the data with the packets with sequence numbers (m, 1+1) received before the switchover and those with sequence numbers (m+2, m+5) after the switchover, as shown in FIG. 6.

The bumper-B may also only retransmit the packets with sequence numbers (m+2, m+5) according to the sequence numbers of the packets received by the peer side, and in such case the peer side needs not to discard the packets. In can be seen from the whole switchover process that, the TCP-A may successfully transmit the data to the peer side without the dependency on the APP-A, and may ensure the integrity of the data. The APP-A may regard the data that sent to the TCP-A is successfully transmitted to the peer side, thereby implementing the reliable switchover the TCP connection.

The embodiments of the disclosure effectively solve the problem of TCP packet boundary and ensure data transmission without loss; moreover, the data is backed up on the AMB and SMB respectively, which simplified the buffer process. And bumpers are adopted to back up the data, which implements the convergence of the data, improves the utilization ratio of the IPC tunnel. And each of the AMB and the SMB only backs up data in one direction, which has a higher efficiency.

The various embodiments of the disclosure also support the TCP sliding window scheme. The process performed by the bumper does not influence the subsequent sliding window process, and furthermore, as the bumper may buffer the data, the TCP transmission rate is not affected, therefore the various embodiments of the disclosure may provide high transmission rate. In addition, the various embodiments of the disclosure may implement the TCP backup without the dependency on the application module. Therefore the disclosure has a wide range of applications.

The foregoing description is only preferred embodiments of this disclosure and is not for use in limiting the protection scope thereof. All the modifications, equivalent replacements or improvements in the scope of the disclosure's spirit and principles shall be included in the protection scope of the disclosure.

What is claimed is:

1. A method for backing up a Transmission Control Protocol (TCP) connection implemented by a transmitting end, wherein the transmitting end comprises an Active Main Board (AMB) and Standby Main Board (SMB), the method comprising:
    obtaining, by the AMB of the transmitting end, boundary information of a data to be transmitted along an active route to a peer side of the TCP connection as a plurality of packets segmented from the data to be transmitted, wherein the boundary information of the data to be transmitted comprises a begin sequence number and an end sequence number of the packets segmented from the data to be transmitted; and
    backing up the data to be transmitted and the boundary information of the data to be transmitted by transmitting the data to be transmitted and the boundary information of the data to be transmitted from the AMB to the SMB of the transmitting end before the AMB transmits part or all of the packets segmented from the data to be transmitted along the active route to the peer side of the TCP connection.

2. The method of claim 1, wherein obtaining the boundary information comprises calculating the boundary information of the data to be transmitted according to size information of the data to be transmitted and a Maximum Segment Size (MSS) of the TCP connection.

3. The method of claim 1, wherein the AMB backing up the data to be transmitted and the boundary information of the data to be transmitted to the SMB comprises backing up the data to be transmitted and the boundary information of the data to be transmitted to the SMB by a sliding window scheme, and wherein the data to be transmitted is an Open Systems Interconnection (OSI) application layer data packet.

4. The method of claim 1, wherein the AMB and the SMB communicate with each other through Inter-Process Communication (IPC) message to transmit the data to be transmitted and the boundary information of the data to be transmitted.

5. An apparatus for backing up a Transmission Control Protocol (TCP) connection, comprising:
    an Active Main Board (AMB); and
    a Standby Main Board (SMB),
    wherein the AMB is configured to:
        obtain boundary information of a data to be transmitted along an active route to a peer side of the TCP connection as a plurality of packets segmented from the data to be transmitted, wherein the boundary information of the data comprises a begin sequence number and an end sequence number of the packets segmented from the data to be transmitted; and
        back up the data to be transmitted and the boundary information of the data to be transmitted by transmitting the data to be transmitted and the boundary information of the data to be transmitted from the AMB to the SMB of the transmitting end before the AMB transmits part or all of the packets segmented from the data to be transmitted along the active route to the peer side of the TCP connection, and
    wherein the SMB is configured to back up the data to be transmitted and the boundary information of the data to be transmitted by storing the data to be transmitted and the boundary information of the data to be transmitted in the SMB before the AMB transmits part or all of the packets segmented from the data to be transmitted along the active route to the peer side of the TCP connection.

6. The apparatus of claim 5, wherein the AMB comprises:
a bumper configured to buffer the data to be transmitted, obtain the boundary information of the data to be transmitted, and send the data to be transmitted and the boundary information backed up to the SMB; and
a TCP module configured to receive the data to be transmitted from the bumper and transmit the data to be transmitted to the peer side.

7. The apparatus of claim 6, wherein the bumper of the AMB is further configured to obtain size information of the data to be transmitted and send the size information to the TCP module of the AMB, and wherein the TCP module of the AMB is further configured to calculate the boundary information of the data to be transmitted according to the size information of the data and a Maximum Segment Size (MSS) of the TCP connection, and send the boundary information calculated to the bumper of the AMB.

8. The apparatus of claim 6, wherein the bumper of the AMB is further configured to calculate the boundary information of a subsequent data according to the boundary information received and the MSS of the TCP connection.

9. The apparatus of claim 6, wherein the bumper of the AMB is an independent module or is located in the TCP module of the AMB, and wherein the data to be transmitted is not at an Open Systems Interconnection (OSI) transport layer packet.

10. The apparatus of claim 5, wherein the SMB comprises:
a TCP module configured to receive data from the peer side and boundary information of the data to be transmitted that has been received by the peer side, and back up the data received from the peer side and the boundary information of the data to be transmitted that has been received by the peer side to the AMB;
a bumper configured to buffer data from the peer side and the boundary information of the data to be transmitted that has been received by the peer side, determine that the data to be transmitted has been received by the peer side according to whether the boundary information of the data to be transmitted has been received by the peer side, and delete the data to be transmitted backed up by the bumper when the data to be transmitted has been received by the peer side.

11. The apparatus of claim 10, wherein the bumper of the SMB is an independent module or is located in the TCP module of the SMB.

12. The method of claim 1, further comprising:
sending, by the AMB, one or more packets of the data to be transmitted and the sequence number(s) of the one or more packets to the peer side of the TCP connection;
determining, by the SMB, a switchover of the TCP connection occurs after the one or more packets and the sequence number(s) of the one or more packets has been transmitted to the peer side of the TCP connection;
determining, by the SMB, the sequence number(s) of packet(s) having not been received by the peer side according to the sequence number(s) sent by the peer side and the boundary information; and
sending, by the SMB, the packet(s) having not been received by the peer side to the peer side.

13. The apparatus of claim 5, wherein the AMB is further configured to send one or more packets of the data to be transmitted and the sequence number(s) of the one or more packets to the peer side of the TCP connection, and wherein the SMB is configured to:
determine a switchover of the TCP connection occurs after the one or more packets and the sequence number(s) of the one or more packets has been transmitted to the peer side of the TCP connection;
determine the sequence number(s) of packet(s) having not been received by the peer side according to the sequence number(s) sent by the peer side and the boundary information; and
send the packet(s) having not been received by the peer side to the peer side.

* * * * *

UNITED STATES PATENT AND TRADEMARK OFFICE
CERTIFICATE OF CORRECTION

PATENT NO. : 8,572,270 B2  
APPLICATION NO. : 12/204499  
DATED : October 29, 2013  
INVENTOR(S) : Hanjun Luo et al.

Page 1 of 1

It is certified that error appears in the above-identified patent and that said Letters Patent is hereby corrected as shown below:

Title Page 2, Other Publications, Col. 2, lines 1, 3, 5, 7, 9 and 12, - The following publications should read as follows:

Alvisi, L., et al., "Wrapping server-side TCP to mask connection failures", XP010538713, Apr. 22, 2001, 10 pages.

"Providing Open Architecture High Availability Solutions Revision 1.0", Feb. 2001, 112 pages.

Notice of Opposition issued in corresponding European patent application No. EP07252874.8, Oct. 23, 2010, 15 pages.

Search report issued in corresponding European patent application No. EP07252874.8, Mar. 5, 2008, 8 pages.

Office action issued in corresponding Chinese patent application No. 200780000357.8, Apr. 2, 2010, and English translation thereof, 5 pages.

Written Opinion issued in corresponding PCT application No. PCT/CN2007/070048, Aug. 30, 2007, 3 pages.

Signed and Sealed this  
Twenty-fourth Day of December, 2013

Margaret A. Focarino  
*Commissioner for Patents of the United States Patent and Trademark Office*